United States Patent [19]

Fukae et al.

[11] Patent Number: 4,825,245
[45] Date of Patent: Apr. 25, 1989

[54] DUPLEX PRINTING MODULE FOR AN ELECTROGRAPHIC PRINTER

[75] Inventors: Kensuke Fukae, Monsey, N.Y.; Shozo Kaieda, Nagano, Japan

[73] Assignee: Kentek Information Systems, Inc., Allendale, N.J.

[21] Appl. No.: 116,362

[22] Filed: Nov. 2, 1987

Related U.S. Application Data

[63] Continuation-in-part of Ser. No. 39,464, Apr. 16, 1987, Pat. No. 4,758,862.

[51] Int. Cl.$^4$ ............................................. G03G 15/00
[52] U.S. Cl. ................................... 355/3 SH; 355/24
[58] Field of Search ................. 355/3 SH, 14 SH, 23, 355/24, 26, 48, 50; 271/3.1, 291, 902, 186

[56] References Cited

U.S. PATENT DOCUMENTS

| | | | |
|---|---|---|---|
| 3,672,765 | 6/1972 | Altmann | 355/24 |
| 3,697,171 | 10/1972 | Sullivan | 355/24 X |
| 3,960,445 | 6/1976 | Drawe | 355/24 X |
| 4,214,831 | 7/1980 | Reesen | 355/24 X |
| 4,264,183 | 4/1981 | Stoudt | 355/24 X |
| 4,333,641 | 6/1982 | Peter | 271/291 X |
| 4,362,379 | 12/1982 | Tiek et al. | 271/3.1 X |
| 4,365,886 | 12/1982 | Murakami et al. | 355/3 SH |
| 4,674,866 | 6/1987 | Tanaka | 355/24 X |
| 4,708,462 | 11/1987 | Stemmle | 355/3 SH |

*Primary Examiner*—R. L. Moses
*Attorney, Agent, or Firm*—Marmorek, Guttman & Rubenstein

[57] ABSTRACT

An electrographic printing apparatus capable of duplex printing comprises a housing, a source of copy material and an output tray for receiving such copy material after it is imprinted, and a photoconductive member for storing a latent electrostatic image of the information to be imprinted. The printer/copier has first and second paper paths located near the top of the housing so that access to the paper may be achieved from the top of the housing. A photoconductive member is located below the first paper path and comes into contact with a first side of the paper from below in a transfer zone located in the first paper path to imprint the first side of the paper. The second paper path is operative to receive paper after it has passed through the transfer zone and information has been transferred to the first side of the paper. As the paper travels along the second paper path, it is turned over and then returned to the first paper path prior to the transfer zone so that the second side of the paper is imprinted from below by the photoconductive member. The invention also encompasses a duplexing unit which is attachable as a module to the body of an electrographic printer to convert it from a simplex printer to a duplex printer.

25 Claims, 7 Drawing Sheets

DUPLEX PRINTING MODULE FOR AN ELECTROGRAPHIC PRINTER

BACKGROUND OF THE INVENTION

This is a continuation-in-part of pending application Ser. No. 039,464 filed Apr. 16, 1987 now U.S. Pat. No. 4,758,862.

This invention relates to an electrographic printer or copying machine having a simplified paper path, and which is capable of printing on both sides of a sheet of paper. More specifically, the present invention relates to an electrographic printer or copying machine which employs a vertically mounted photoconductive belt assembly for printing on one side of a sheet of paper as it passes over the photoconductive belt, and which is capable of recycling the paper to print on the other side of the sheet of paper as it passes over the photoconductive belt a second time. This invention also relates to a duplex printing module which attaches as a unit to an electrographic printing machine to convert the machine from a simplex printer to a duplex printer.

In the process of electrographic or xerographic printing, a photoconductive member is employed to record an image. The photoconductive member, which may be in the form of a belt or a drum, is charged to a substantially uniform potential to sensitize its photosensitive surface. In the case of a copying machine, a light is shined on an original document to be copied. Through the use of lenses, mirrors, and various other optical components, the charged portion of the photoconductive surface is exposed to a reflected light image of an original document to be reproduced. The light image is recorded as an electrostatic latent image on the photoconductive member. This latent image corresponds to the informational areas contained on the original document.

In the case of an electrographic printer connected to computer, a similar process is used to record information on the photoconductive member. The charged portion of the photoconductive surface is exposed to a light image produced by an optical print head. The precise shape of the light image is controlled by input signals from the computer. For example, a laser or an LED array may be used as a optical print head which receives input signals from the computer to illuminate the photoconductive member with a light image of a particular shape. Here too, an electrostatic latent image corresponding to the desired informational areas is recorded o the photoconductive member.

As used herein, the term "electrographic printing apparatus" and the like refer to both electrographic printers and copiers.

After recording the electrostatic latent image on the photoconductive member, the latent image is developed by bringing a developer material or toner into contact with it. The developer material is attracted to the electrostatic latent image and forms a powder image on the photoconductive member corresponding to the electrostatic latent image. The powder image is subsequently transferred to a sheet of recording medium, such as a sheet of paper, in a transfer region. Thereafter, the powder image is permanently affixed to this sheet in image configuration by a variety of methods, such as by fusing.

The above-mentioned operations may be carried out by arranging a number of stations in sequence about the photoconductive member. Thus, the photoconductive member is usually surrounded in sequence by a charging station to charge the photoconductive member, an imaging station to form an electrostatic latent image on the photoconductive member, a developing station to develop the electrostatic latent image on the photoconductive member, and a transfer station to transfer the developed image from this photoconductive member to the sheet of recording medium. A discharging station and a cleaning station ar also arranged about the photoconductive member to ready it for use again.

An example of such an electrographic printing apparatus is disclosed in allowed application Ser. No. 700,813, filed Feb. 11, 1985, now U.S. Pat. No. 4,664,507. The electrographic printer/copier described in that patent application employs a photoconductive belt assembly in the form of a disposable cassette which is the subject of allowed application Ser. No. 718,947, filed Apr. 2, 1985, now U.S. Pat. No. 4,657,369. The printer/copier described in application Ser. No. 700,813 also employs the combined developing and cleaning unit which is the subject of allowed application Ser. No. 718,946, filed Apr. 2, 1985, now U.S. Pat. No. 4,639,116. All of the aforementioned patent applications are assigned to the present assignee and all are incorporated herein by reference.

The electrographic printer/copier described in application Ser. No. 700,813 has a simplified paper path permitting access from the top of the machine. In that electrographic printer/copier, the cassette containing the photoconductive belt is mounted vertically within the machine and a latent image is developed on the underside of the copy sheet as it passes over and comes in contact with the top of the photoconductive belt assembly.

The electrographic printer/copier described in that application requires two rotations of the photoconductive belt per copy produced. In actual practice, it is capable of producing about 12 copies per minute. During the first rotation of the photoconductive belt, the belt is uniformly charged and a latent image is generated by means of an optical print head on the surface of the photoconductive belt. The latent image thus formed is developed by the deposition of toner from a combined developer/cleaning unit operating in the develop mode. The belt then enters the transfer region wherein the developed image is transferred to the underside of the paper or other copy material. In the transfer region, a transfer unit generates an electrical field which attracts the toner from the photoconductive belt to the underside of the paper. This completes the first rotation of the belt as the paper travels to a fuser unit and is discharged into the output tray.

During the next revolution of the belt, the belt is prepared for making the next copy. The main charging unit and the optical print head are disabled while an erase lamp is activated and the developer/cleaner unit is switched to the clean mode. Thus, as the belt continues to rotate following image transfer, the photoconductive belt is discharged by an eras lamp and the excess toner is removed using a conventional electrostatic process by the developer/cleaner unit. The belt is thereby readied for printing on the next page.

One of the primary objects of the electrographic printer/copier described in application Ser. No. 700,813 is to provide a machine which is reliable over an extended period of use and which is easily serviceable. To accomplish this, the machine is provided with modular units which are easily removed and replaced at specified time intervals or when they malfunction. In addition, the machine is provided with a simplified paper path whereby the paper always travels along a substantially planar path located near the top of the machine. The paper is imprinted on its underside as it travels along this paper path and passes across the top of the vertically mounted photoconductive belt.

By providing this "straight-through" paper path, the number of paper jams is considerably reduced. In the event a paper jam does occur, the lid of the machine can be opened and the jammed paper can be readily accessed from the top of the machine. This is in contrast to prior art machines wherein paper jams can only be accessed from the side of the machine. Additionally, because the paper is imprinted on its underside, and because the machine has a "straight-through" paper path, the paper is ejected into the output tray face down. Thus, the paper is automatically collated as it is being printed and ejected.

One feature that the electrographic printer/copier described in application Ser. No. 700,813 lacks is the ability to perform duplex printing, i.e, the ability to print on both sides of a sheet of paper. Duplex printing is important in many applications, for example, in printing a book or in "desktop publishing" applications.

Another shortcoming of the electrographic printer/copier described in application Ser. No. 700,813 is that it requires two revolutions of the photoconductive belt to print on a side of the paper.

Accordingly, it would be desirable to provide an electrographic printer/copier having a simplified paper path similar to that of the printer/copier described in application Ser. No. 700,813, but which is capable of performing single-sided and duplex printing.

It would be desirable if the paper path for this duplex printing apparatus were near the top of the machine to provide easy access in case of paper jams.

It would further be desirable if this electrographic printing machine required only a single revolution of its photoconductive member per side of copy material imprinted.

It would further be desirable to provide a duplexing unit which is a modular unit and is capable of converting a simplex electrographic printing apparatus into a duplex printer.

SUMMARY OF THE INVENTION

These and other objects are achieved by means of the present invention which provides an electrographic printing apparatus for producing hard copies of information to be recorded on two sides of a sheet of paper or other cop material. The electrographic printing apparatus comprises a housing open on top, a lid for covering the top of the housing, a source of paper, an output tray for receiving the paper after it is imprinted, and a photoconductive member for storing a latent electrostatic image of the information to be imprinted on the paper. The electrographic printing apparatus includes rollers for guiding the paper along first and second paper paths. The paper travels along the first paper path between the source and the output tray, the first paper path being substantially contained in a single plane located near the top of the housing. The photoconductive member is located below the first planar paper path. It comes in contact with a first side of the paper from below in a transfer zone which is located in the first paper path to transfer the latent electrostatic image to that first side of the paper. The paper travels from source to output tray along the first paper path when single-sided printing is desired. In such case, the paper path of the present printing apparatus is similar to the paper path of the printer/copier described in application Ser. No. 700,813.

The electrographic printing apparatus of the present invention also includes a second substantially planar paper path located near the top of the housing. When duplex printing is selected, the paper is received in the second paper path after it has been imprinted on its first side. The paper is turned over in the second paper path so that its second side becomes its underside. The paper is then returned to the first paper path to pass through the transfer zone once again so that the photoconductive member comes into contact with the second side of the paper from below in order to transfer the latent electrostatic image to the second side of the paper. The paper is then ejected into the output tray with its second side down.

In preferred embodiment, the electrographic printing apparatus of the present invention includes a paper skew correction station located along the second paper path. The paper enters the paper skew correction station and is realigned prior to being recycled into the first paper path for printing on the other side of the paper.

Preferably, the two paper paths taken together schematically form a loop and a branch extending from the loop. The photoconductive member is located below a first straight portion of the loop. The paper travels along this first straight portion of the loop with a leading edge in front. As it travels along the first straight portion of the loop., the sheet of paper is imprinted from below on a first side. The paper then travels through an area of reversion where it is turned over so that its second side becomes its underside, and enters a second straight portion of the loop. From there, the paper enters the branch with its leading edge first. A paper skew correcting device is located in the branch and the paper is realigned horizontally. Thereafter, the sheet of paper, without being turned over, is returned to the first straight portion of the loop where it is imprinted from below on its second side. This time, the paper travels along this portion of the loop with its previously trailing edge in front. After the paper passe through the transfer zone a second time, it is ejected into the output tray.

In this preferred embodiment of the present invention, the developer/cleaning unit described in the previously mentioned application Ser. No. 718,946 is not employed. Instead, a separate and independent cleaning unit is employed. This cleaning unit is mounted on the photoconductive member so that it is located immediately after the transfer zone. The cleaning unit operates to clean residual developer particles from the photoconductive member after the powder image has been transferred to the paper. By using a separate and independent cleaning unit, the electrographic printer/copier is capable of imprinting a sheet of paper with only a single revolution of the photoconductive member being required per side.

The present invention also provides a duplexing unit which is attachable as a modular unit to an electrographic printing machine. This duplex unit converts a simplex printer into a duplex printer. The duplexing unit includes a frame, an upper region, a lower region, reversion areas, and paper transport means. The lower region of the duplexing unit forms a portion of a first paper path along which a sheet is imprinted on a first side. The top and the reversion areas form a second paper path along which the sheet is turned over and returned to the first paper path to imprint the sheet on its second side. The duplexing unit also includes a hinging mechanism for attaching the unit to the body of the electrographic printing apparatus.

DETAILED DESCRIPTION OF THE PREFERRED EMBODIMENT

Figure 1:
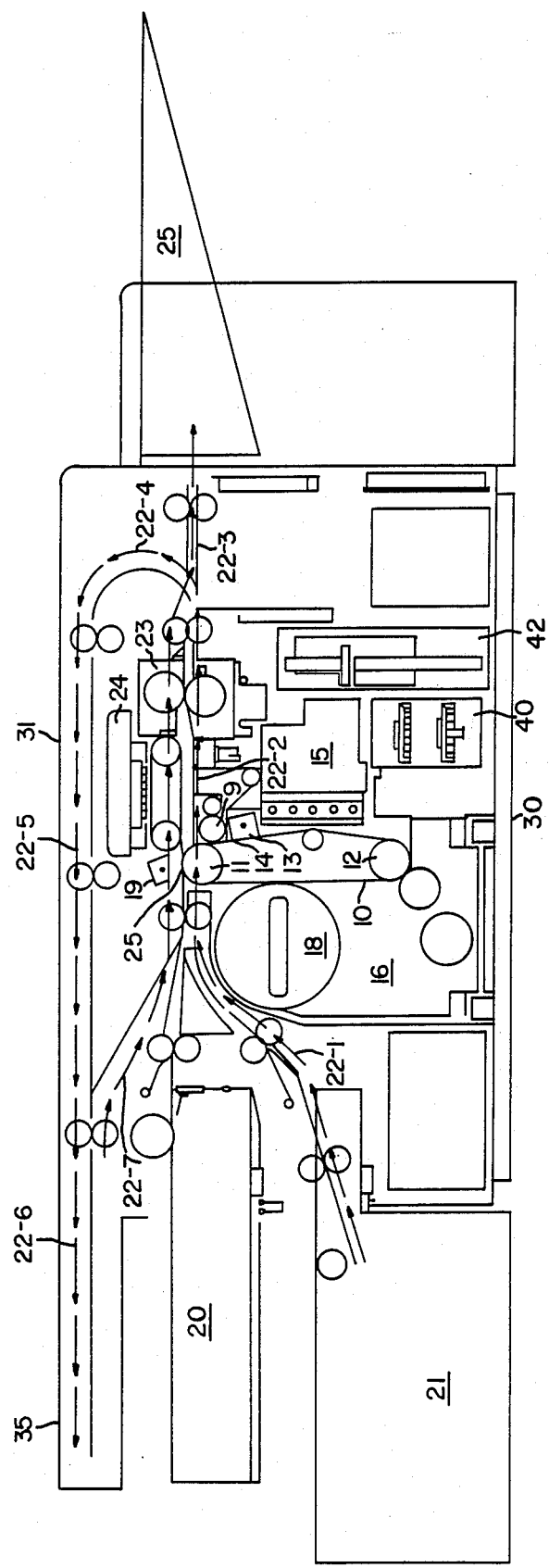
FIG. 1 is a schematic diagram of an electrographic printer in accordance with an illustrative embodiment of the present invention.

FIG. 1 is a block diagram showing the basic components of an electrophotographic printer in accordance with one aspect of the present invention. Such printers typically include a photoconductive member which, in the illustrative embodiment, is photoconductive belt 10. Desirably, the photoconductive member comprises the photoconductive belt assembly in the form of a disposable cassette which is disclosed and claimed in the previously mentioned allowed application Ser. No. 718,947, filed Apr. 2, 1985. As illustrated in FIG. 1, this photoconductive belt assembly is mounted vertically in the electrographic printer. It includes a sheet guiding structure (not shown) at the top of its frame which guides the sheet across its top. The sheet guiding structure defines a horizontal transfer zone 25 of short length below the top of the housing 30 of the printer. Housing 30 includes a top 31 which is hinged so that it can be lifted upwardly and provide access to the inside of the electrographic printer.

The photoconductive belt rotates clockwise as shown by means of rollers 11 and 12. Located along the right side of the belt, as viewed in FIG. 1, are a cleaning unit 9, erase lamps 14, a main charger 13, and an optical print head 15. On the left side of the belt is the developer unit 16. This unit contains a toner cartridge 18 for convenient handling. Located at the top of the belt path, is a transfer unit 19, which unit creates an electric field to attract toner from the photoconductive belt 10 onto the underside of sheets of paper or other copy material passing through the image transfer region 25. The copy material travels along a paper path which is generally designated with the number 22. As it travels along this paper path the copy material passes through transfer region 25 where it is imprinted from below.

The novel paper path of the illustrated printer will now be described by reference to the arrows shown particularly in FIGS. 2 and 3. These figures show three sheets being transported along a duplex paper path.

The copy material, e.g., paper, is derived from either of two convenient paper handling cassettes 20 or 21. For purposes of explanation, it will be assumed that a sheet of paper with a first side "A" facing down and a second side "B" facing up is supplied in FIGS. 2 and 3 by the upper cassette 20 by means of suitable rollers. The paper is first directed along a branch 22-1 of the paper path until it enters a first main portion 22-2 of the paper path, as shown by the lower set of arrows in FIGS. 2. Portion 22-2 of the paper path leads the sheet of paper into contact with photoconductive belt 10 in image transfer region 25 located between the upper roller 11 and the transfer unit 19. While the sheet of paper is in transfer region 25, it is imprinted from below onto its underside, in this case side A. From the image transfer region 25, the paper is transported along portion 22-2 of the paper path 22 to a fuser unit 23 by means of a vacuum transport unit 24. In the event duplex printing has not been selected, the paper continues along a branch 22-3 of the paper path as shown in FIG. 1 and is ejected into output tray assembly 25 with its printed side, side A, face down, thus being automatically collated.

Thus far, the description of the present invention is similar to that for the electrographic printer/copier described in application Ser. No. 700,813. In the event duplex printing is selected, the sheet of paper is not ejected into output tray 25 after it passes through fuser unit 23. Rather, the paper enters an area of reversion 22-4 of paper path 22 shown in FIG. 2 where it is turned over so that side B now becomes the underside. The paper then enters second main portion 22-5 of paper path 22. This second main portion 22-5 of the paper path is located immediately below the top of the printer. Being located in such close proximity to the top permits easy access to the sheet of paper as it travels along the paper path in the event of a paper jam.

Figure 2:
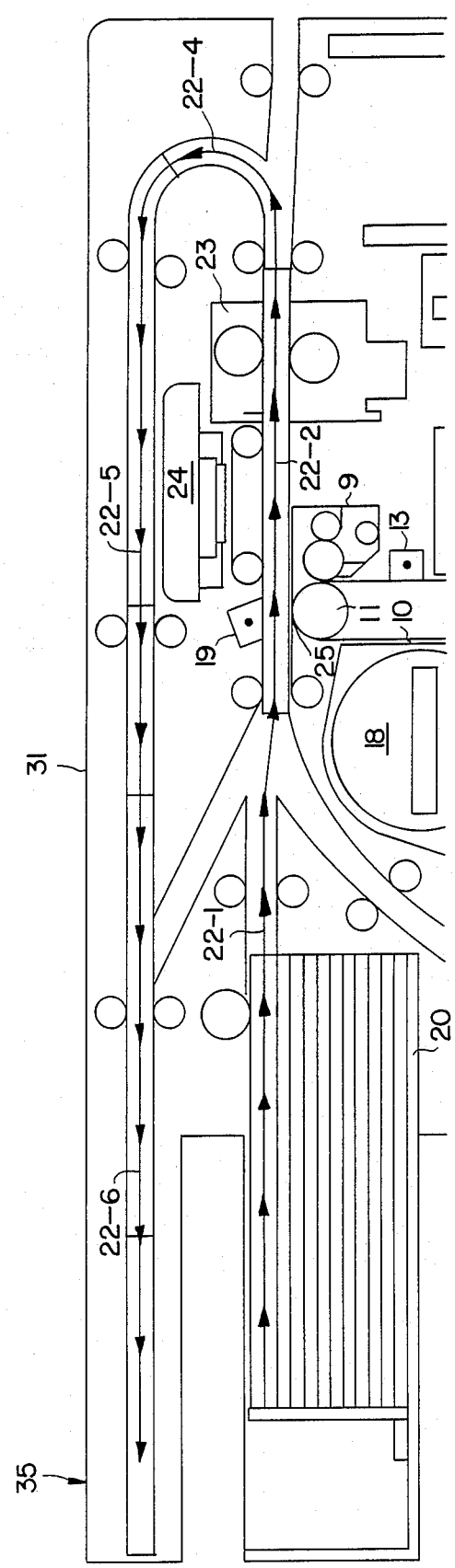
FIG. 2 is a schematic diagram of several sheets of paper traveling along a first portion of a duplex paper path.

As shown in FIG. 2, the sheet of paper next enters a branch 22-6 of paper path 22 where a paper skew correction device 35 is mounted on top 31. Paper skew correction device 35 mechanically realigns the paper horizontally so that when it is imprinted on its second side, side B, all of the margins will be properly aligned to coordinate with the printing on side A.

Figure 3:
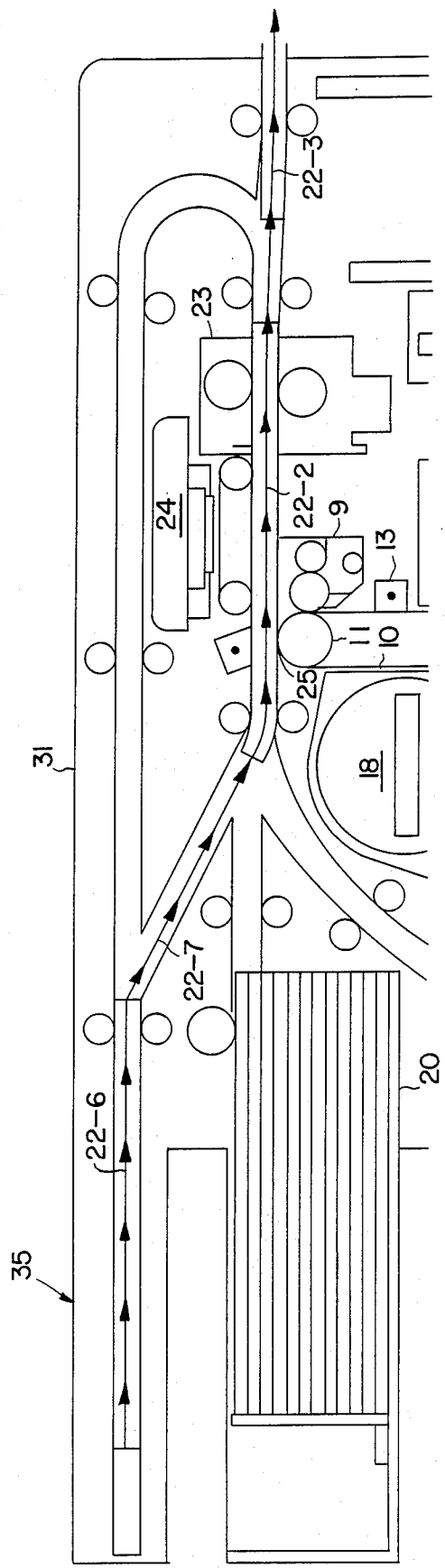
FIG. 3 is a schematic diagram of several sheets of paper completing a duplex paper path.

After being realigned by paper skew correction device 35, the paper returns to the first main portion 22-2 of paper path 22 via a second reversion portion 22-7 as shown in FIG. 3. This time the sheet travels along portion 22-2 with its second side, side B, as its underside. The paper enters transfer region 25 once again and information is printed on side B of the sheet of paper as it makes contact with the photoconductive belt 10. Next, the printed paper is transported to fuser unit 23 by means of vacuum transfer unit 24 whose only contact now is with side A, the already imprinted and fused side of the paper. The unfused side, side B, does not come in contact with transfer unit 24 thus avoiding smudging on that side of the paper. The fuser unit 23 then fuses the toner onto side B of the paper by applying heat to the paper and the paper is ejected into output tray 25 with side B facing down. Since all of the imprinted paper is received with side B facing down, the paper is automatically collated as it is collected in output tray 25.

It will be observed that as the sheet of paper travels along straight portion 22-2 of the paper path, it travels with a leading edge, for example, the top of the sheet, in front. As the sheet passes through reversionary area 22-4 and enters straight portion 22-5 of the paper path, the sheet is turned over, so that side B becomes the underside. During this portion of the paper path, the sheet is still travelling with the same leading edge in front. It then enters branch 22-6, leading edge first, for realignment. When the sheet leaves branch 22-6 in order to re-enter portion 22-2 of the paper path, however, it does so with its trailing edge, i.e., its bottom edge, in front and with side B as its underside. In other words, the sheet of paper "backs out" of branch 22-6. As a result, of this backing out operation, the sheet is not turned over once again when it travels from portion 22-5 of the paper path back into portion 22-2. Side B which is the underside of the sheet as it travels along portion 22-5 of the paper path, remains the underside when it re-enters portion 22-2 of the paper path.

Summarizing, in the event duplex printing is not selected, the paper path may be described as follows:

20→22-1→22-2→22-3→25 with the paper being imprinted from below on Side A. In the event duplex printing is selected, the paper path is as follows:

20→22-1→22-2→22-4→22-5→22-6→22-7→22-2→22-3→25 with a "backing-out" operation occurring between portions 22-6 and 22-7 of the paper path, and with the paper being imprinted on both sides A and B.

It will be observed from this description and from FIG. 1, that the paper path schematically comprises a loop (22-2, 22-4, 22-5, and 22-7) with a number of branches (22-1, 22-3, and 22-6) extending from the loop. In particular, for duplex printing to take place, it is important that the paper follow a path comprising the loop 22-2, 22-4, 22-5, and 22-7, with a stop at the branch 22-6 for a backing out operation.

The operation of this printer involves only a single rotation of belt 10 per side imprinted. During this rotation, the belt is uniformly charged as it passes main charger 13. A latent image is generated by means of optical print head 15, which can be either a laser or an LED array. The optical print head serves to discharge selected portions of the uniformly charged photoconductive belt 10 as it moves past the optical print head. The latent image thus formed is then developed by the deposition of toner particles from the developer unit 16. Illustratively, the toner is deposited only on the discharged portions of the photoconductive belt 10. The belt then enters the transfer region 25 wherein the developed image is transferred to the underside, which is either side A or side B, of the paper. In the transfer region 25, the transfer unit 19 serves to form an electric field which attracts the toner from the photoconductive belt 10 to the underside of the paper.

Having transferred the developed image to the underside of the paper, the photoconductive belt 10 must then be readied for imprinting the next copy or the other side of the sheet of paper if duplex printing has been selected by the operator. The photoconductive belt 10, continuing in the same revolution, is first cleaned by means of cleaning unit 9. The eras lamps 14 are then activated to uniformly discharge the photoconductive belt. Thus, as the belt rotates following image transfer, the excess toner is removed by the cleaning unit 9 and the belt is discharged by erase lamps 14. The belt is thereby readied to be charged again by main charger 13 for imprinting of the next copy or the other side of the sheet of paper.

As noted hereinabove, it is a feature of the present invention that the copy is always formed along the underside of the paper as it travels along paper path 22 through the transfer zone 25. This is accomplished by locating the photoconductive belt 10 below the straight portion 22-2 of the paper path. Thus, in the illustrative embodiment of FIGS. 1, 2 and 3, the transfer region 25 is located above roller 11 and the paper enters the region with its lower surface in contact with belt 10.

To avoid smudging the copy following image transfer, the printed paper is transported to the conventional fuser unit 23 by means of a vacuum transfer unit 24 whose only contact is with the upper side of the paper. This side either has no toner on it, or has already fused toner on it. The fuser unit 23 serve to fuse the toner to the underside paper by way of applying heat to the paper.

The cleaning unit 9 may comprise any of a number of conventional devices which have been used to remove residual toner particles from photoconductive members. Cleaning unit 9 may comprise, for example, a cleaning brush or a scraper blade. Preferably, cleaning unit 9 comprises an electrostatically charged cleaning device. Such devices are maintained at a suitable biasing voltage as a result of which they are able to attract toner particles from the photoconductive member. Most preferably, cleaning unit 9 comprises one of the electrostatic cleaning devices described in the co-pending applications entitled "DEVICE FOR REMOVING RESIDUAL DEVELOPER PARTICLES FROM A PHOTOCONDUCTIVE MEMBER" or "TONER CLEANING UNIT". These applications are assigned to the common assignee of the present application and are incorporated herein by reference. These applications are directed to cleaning units which can be suitably mounted on a photoconductive belt assembly such as that illustrated herein. In the embodiment illustrated in FIGS. 1, 2 and 3, cleaning unit 9 comprises the fur brush, roller, and scraper blade combination described in one of the aforementioned co-pending applications.

As a result of the use of a separate and independent cleaning unit, the electrographic printer described herein comprises a "one-pass" rather than a "two-pass" machine, i.e., one side of the sheet of paper is imprinted per revolution of the photoconductive belt. Thus, the output of the machine is effectively twice that of the electrographic printer disclosed in application Ser. No. 700,813. In actual practice, the electrographic printer described herein is capable of printing 24 sides per minute vs. 12 sheets per minute for the printer described in application Ser. No. 700,813.

The electrographic printer illustrated in FIG. 1 is a so-called "smart printer". That is, this electrographic printer contains an on-board controller also known as an image generation system (IGS) which controls and coordinates each of the operations of its various components. The IGS receives a variety of signals from various sensors and command stations associated with the printer and sends out a variety of signals in response thereto. Thus, the IGS receives signals from various sensors to detect malfunctions in the printer and sends out signals to alert the operator to these malfunctions. The IGS also interfaces with a computer terminal, as well as with a diskette drive 40 and hard disk drive 42, to control operation of the print head 15.

The IGS controls all of the operations of the printer such as the timing of the various components of the printer. It also detects when the operator has selected duplex printing and directs the paper transport mechanism to pass the sheet of paper into the duplex printing path.

Another important function of the IGS is to reformat the light image projected by optical print head 15 onto photoconductive belt 10 when imprinting on the second side of the sheet of paper is about to occur. As described above, the sheet of paper passes through portion 22-2 of the paper path the first time with a leading edge in front. However, when the sheet of paper passes through portion 22-2 the second time for printing on its second side, it does so with its trailing edge in front. This is because of the "backing out" operation which occurs when the paper reenters the loop after stopping in branch 22-6. Unless the light image is reformatted by the controller, the printing on the second side of the sheet of paper will be reversed from that on the first side.

Assuming, for example, that the leading edge is the top of the sheet of paper which passes through transfer region 25 the first time, printing will occur from top to bottom on the sheet of paper. When the sheet of paper passes through transfer region 25 the next time for imprinting on its second side, it passes through with its bottom edge first. Thus, in order for information to be printed properly on the second side of the paper, the light image from optical print head 15 must be reformatted from bottom to top. This is accomplished by the IGS when the IGS detects that the duplex printing feature has been selected.

Generally, a piece of paper for printing is logically divided into a larger number of small regions by a fine grid produced by a set of vertical and horizontal lines. In prior art operations, there were 240 vertical and horizontal lines per inch producing 240 dot density. The present system extends the capability of the IGS so that 240, 300, and 400 dot densities can be selectably carried out. This is accomplished by the use of a bit-map RAM.

Broadly, the IGS accepts a description of the text and graphics to appear on a paper from a host computer system and computes the bit pattern and the bit-map RAM corresponding to the desired image. The IGS transfers the contents of the bit-map RAM to the writing circuitry so that the production of the desired images occurs. In the prior art, the image is always transferred beginning at the top of the image and transferring each horizontal line of the image from left to right until the entire image has been transferred. Each horizontal line of the image is called a scan line.

For duplex printing, the transfer of the image cannot be limited to a process which starts at the top image if a relatively simple print engine is used. Accordingly, the IGS can transfer an image either by starting at the top of the image or the bottom of the image as required. Furthermore, the IGS can be operated to transfer an image starting from an intermediate position between the top and bottom of the image if desired.

Generally, the IGS includes a computer processing unit (CPU) including a processing chip such as a commercially available 68000 chip, an EPROM memory, a RAM memory and its support logic, serial communication logic, direct memory access (DMA) logic, and an interface arrangement.

The 68000 processor transforms document-level protocol received from the communication logic into an intermediate form and transforms this into an image in a bit-map memory.

The logic is designed to use a 10 MHz processor rather than the prior art 8 MHz processor. The components of the system should be compatible with the operating speed. For example, the CPU RAM's (not the bit-map RAM's) should operate with 120 ns access time rather than 150 ns access time used in the 8 MHz system.

Generally, support logic for the 68000 chip includes six sub-units: processor clock, reset circuitry, timer circuitry, interrupt circuitry, address decoding circuitry and timeout circuitry. Such sub-units are known in the prior art.

Figure 4:
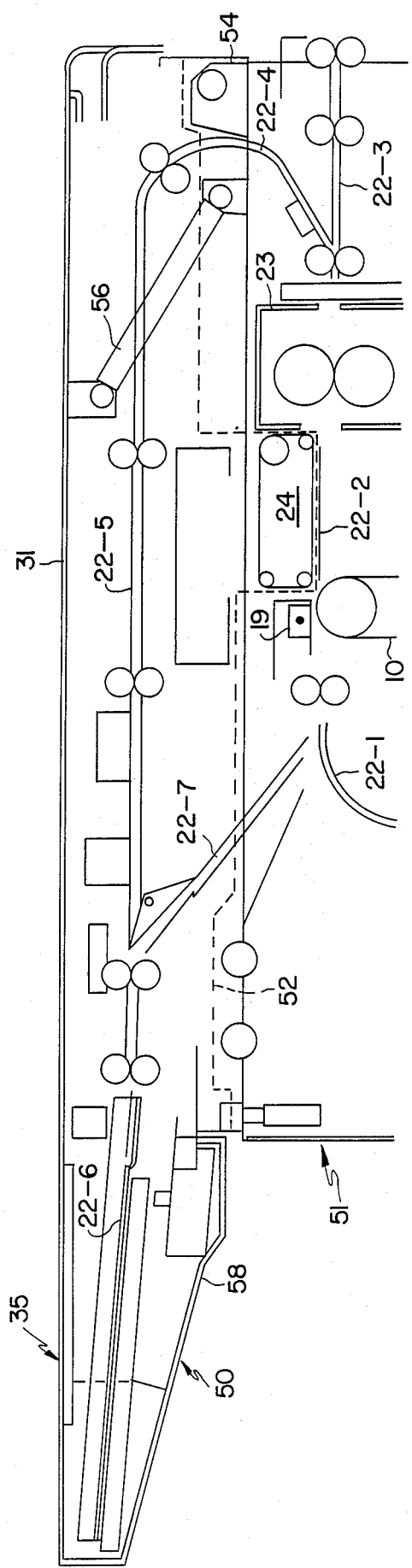
FIG. 4 is a diagram of a duplex printing module attached to the body of a electrographic printing machine.
Figure 5:
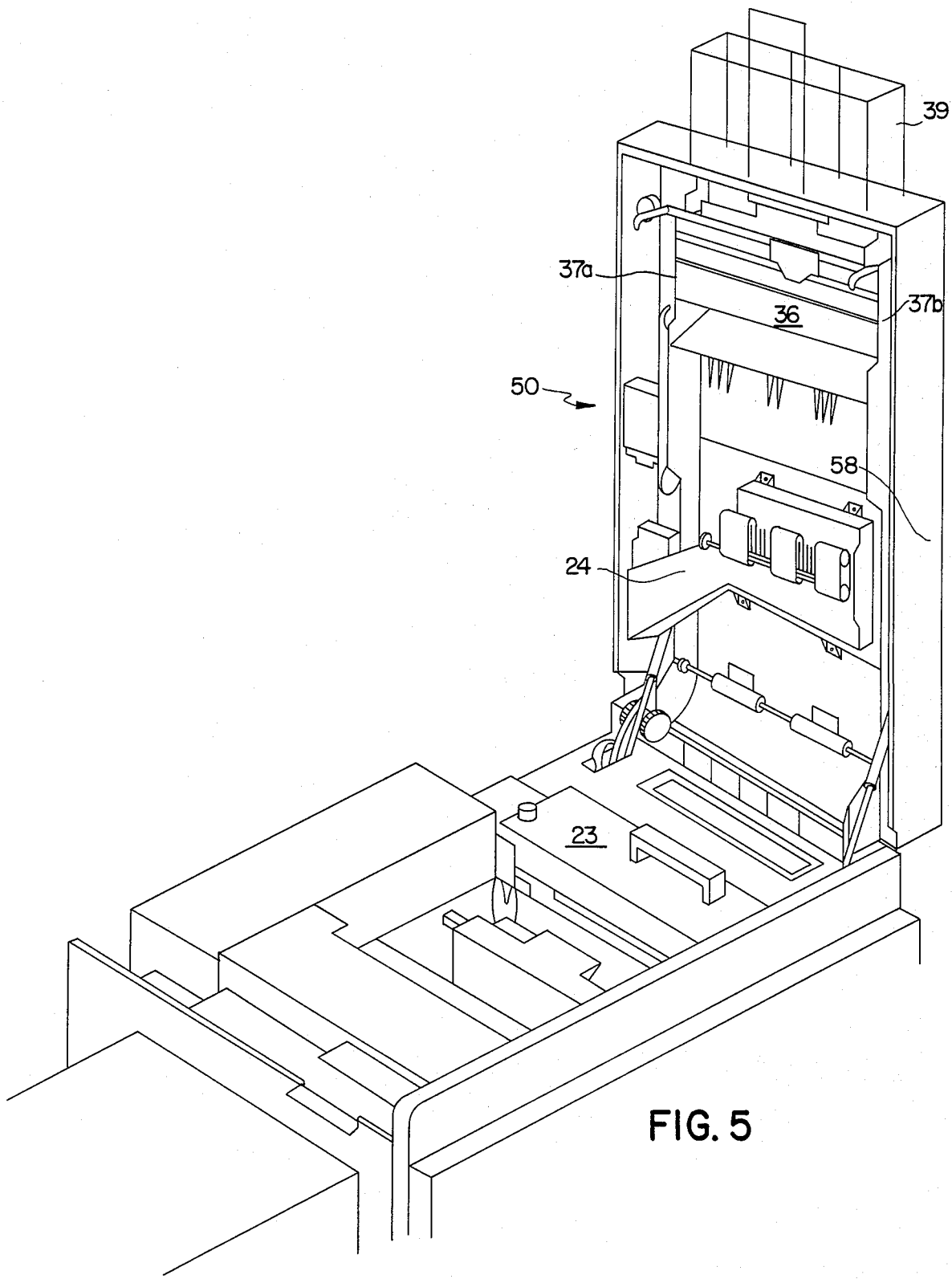
FIG. 5 is a perspective view of a duplex printing module swung upward to provide access to the paper path in the body of the electrographic printing machine.

Referring now to FIGS. 4 and 5, a duplexing unit 50 is illustrated. Duplexing unit 50 is a modular unit which attaches to the body 51 of the electrographic printer above the photoconductive belt. Duplexing unit 50 serves as the top 31 of the electrographic printer when it is attached. Break-line 52 shown in FIG. 4 illustrates the separation of duplexing unit 50 and the body 51 of the electrographic printer.

Figure 6:
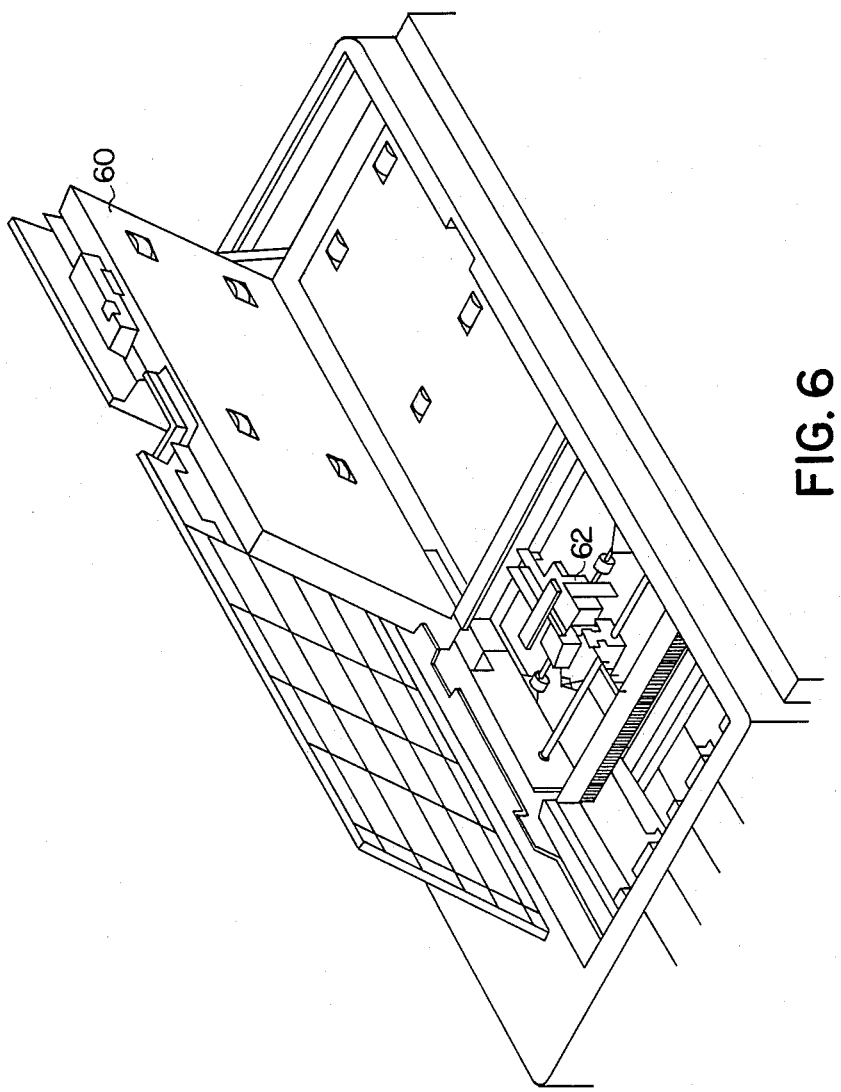
FIG. 6 is a perspective view of a top lid of the duplex printing module swung open to provide access to the paper path.

As illustrated, duplexing unit 50 includes a frame 58. It is attached by hinging mechanism 54 and a pneumatically controlled piston 56 to one end of the body 51 of the electrographic printing apparatus. This arrangement permits duplexing unit 50 to be swung upward a illustrated in FIG. 5. Easy access to portion 22-2 of the paper path is thereby provided to remove paper jams which may occur along this portion of the paper path. As illustrated in FIG. 6, a top lid 60 which is hinged to the top or upper region of duplexing unit 50 provides access to portions 22-5 and 22-6 of the paper path in cases of paper jams occurring along these portions of the paper path.

It will be observed from the drawings that vacuum transport unit 24 forms a part of duplexing unit 50. Duplexing unit also includes paper skew correction device 35, return paper drive 62 and guide rollers for transporting the paper through portions 22-4, 22-5, 22-6, and 22-7 of the paper path. An upper region of duplexing unit 50 serves as part of the paper path while the bottom of duplexing unit 50 serves as the upper paper transport and paper guide system for the simplex portion 22-2 of the paper path. Thus, duplexing unit 50 is a self-contained, modular unit which is attachable to the body 51 of the electrographic printer to convert it from a simplex printing apparatus to a duplex printing apparatus.

Figure 7:
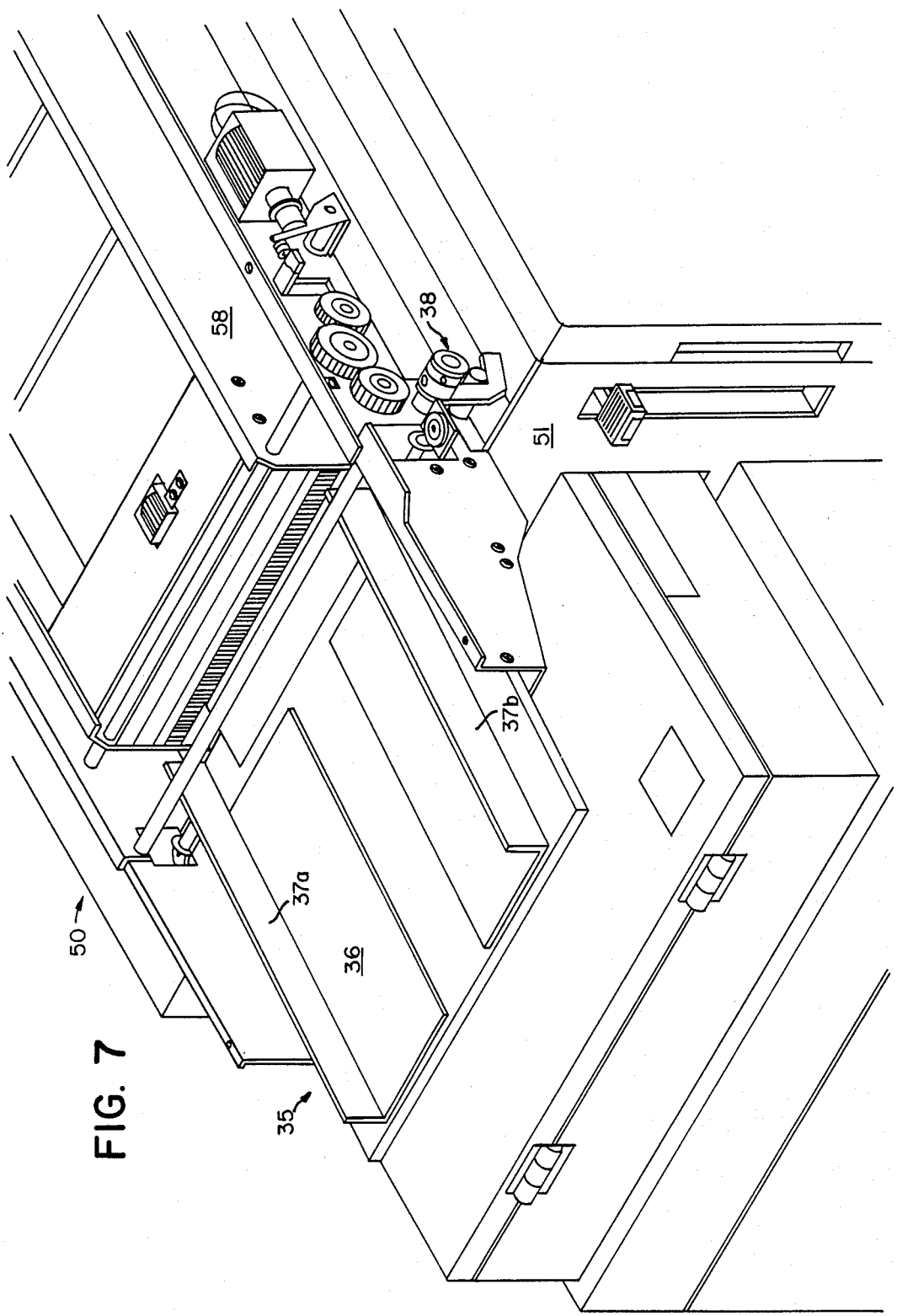
FIG. 7 is a perspective view of a portion of an actual electrographic printer of the present invention showing a paper skew correcting device.

Referring now to FIG. 7, a paper skew correcting device 35 is shown mounted as part of duplexing unit 50. Paper skew correcting device 35 comprises a bed or tray 36 for receiving the paper and guide plates 37a and 37b. A wire cage 39 (FIG. 5) is also provided as an extension of tray 36 to help retain paper thereon. The guide plates 37a and 37b realign the paper when it is ejected onto bed 36. A gearing system 38 is also provided by means of which the distance between guide plates 37a and 37b are adjusted. Gearing system 38 is controlled by the on-board controller which adjusts the distance between the guide plates in response to formatting signals received by the computer. Alternatively, the controller may be interfaced with the input paper trays which have sensor to detect the width of the paper loaded into the trays. An example of such a input paper tray is described in application Ser. No. 718,945, filed Apr. 2, 1985, which is assigned to the present assignee and is incorporated herein by reference. The controller adjusts the distance between guide plates 37a and 37b in response to signals received from these sensors.

In addition, the on-board controller controls the paper rollers inside the electrographic printer and in duplexing unit 50 to carry out the desired "backing-out" operation when the paper visits paper skew correcting device 35. Thus, the controller acts to ensure that the paper rollers turn in one direction to eject the paper onto bed 36 of paper skew correcting device 35, and then acts to reverse the rotational direction of the paper rollers so that the backing-out operation is performed.

Although the present invention has been described in terms of a smart printer, by inclusion of suitable optics, the present invention can be adapted to encompass a smart copier. Thus, with suitable optics, the controller can be instructed to reverse the reflected image so that duplex printing can occur in the case of an electrographic copier machine as well.

While the invention has been described by reference to specific embodiments, this was for purposes of illustration only and should not be construed to limit the spirit or the scope of the invention.

We claim:

1. A duplexing unit for attachment to an electrographic printing apparatus which produces hard copies of information to be recorded on a sheet of paper or the like, comprising
    a first region, a second region, and an area of reversion,
    said first region forming a portion of a first paper path along which said sheet of paper is imprinted on a first side,
    said second region and area of reversion forming a portion of a second paper path, said second paper path being operative to receive said sheet of paper from said first paper path, to turn said paper over, and to return said paper to said first paper path to imprint said paper on a second side, and
    means for attaching said unit on top of an electographic printing apparatus.

2. The duplexing unit of claim 1 further comprising paper transport means for guiding said sheet of paper along said second paper path.

3. The duplexing unit of claim 1 wherein said attachment means comprises hinging means.

4. The duplexing unit of claim 3 wherein said hinging means provides access to said first paper path.

5. The duplexing unit of claim 1 further comprising vacuum transport means for transporting said sheet along said first paper path.

6. The duplexing unit of claim 1 further comprising alignment correction means located along said second paper path.

7. The duplexing unit of claim 1 further comprising a top lid located above said second paper path, said top lid providing access to said second paper path from above.

8. The duplexing unit of claim 1 wherein said first region comprises an upper region and said second region comprises a lower region of said unit.

9. A duplexing unit for attachment to an electrographic printing apparatus which produces hard copies of information to be recorded on a sheet of paper or the like, comprising,
    a first region, a second region, and an area of reversion,
    said first region, second region, and area of reversion comprising a paper path, said paper path comprising a loop and a branch extending therefrom,
    paper transport means for passing said sheet along said loop wherein said sheet is imprinted on a first side, for turning said sheet over, for passing said sheet into said branch, and for returning said sheet to said loop a second time for imprinting a second side of said sheet, and
    means for attaching said unit on top of an electrographic printing apparatus.

10. The duplexing unit of claim 9 wherein said attachment means comprises hinging means for providing access to said paper path.

11. The duplexing unit of claim 9 wherein said first region comprises an upper region and said second region comprises a lower region of said unit.

12. The duplexing unit of claim 9 wherein said paper transport means includes vacuum transport means.

13. The duplexing unit of claim 9 further comprising alignment correction means.

14. The duplexing unit of claim 9 further comprising a top lid located above said paper path, said top lid providing access to said paper path from above.

15. A duplexing unit for attachment to an electrographic printing apparatus which produces hard copies of information to be recorded on a sheet of paper or the like, comprising
    a first region, a second region, and an area of reversion,
    said first region forming a portion of a first paper path along which said sheet of paper is imprinted on a first side,
    said second region and area of reversion forming a portion of a second paper path, said second paper path being operative to receive said sheet of paper from said first paper path, to turn said paper over, and to return said paper to said first paper path to imprint said paper on a second side, and
    alignment correction means located along said second paper path,
    said duplexing unit being attachable as a module to an electrographic printing apparatus.

16. A duplexing unit for attachment to an electrographic printing apparatus which produces hard copies of information to be recorded on a sheet of paper or the like, comprising
    a first region, a second region, and an area of reversion,
    said first region forming a portion of a first paper path along which said sheet of paper is imprinted on a first side,
    said second region and area of reversion forming a portion of a second paper path, said second paper path being operative to receive said sheet of paper from said first paper path, to turn said paper over, and to return said paper to said first paper path to imprint said paper on a second side, and
    an openable lid located adjacent said first and second paper paths, said lid providing access to said first and second paper paths,
    said duplexing unit being attahcable as a module to an electrographic printing apparatus.

17. The duplexing unit of claim 15 wherein said lid is located above said second paper path, said lid providing access to said second paper path from above.

18. A duplexing unit for attachment to an electrographic printing apparatus which produces hard copies of information to be recorded on a sheet of paper to the like, comprising
    a first region, a second region, and an area of reversion, said first region, second region and area of reversion comprising a paper path, said paper path comprising a loop and a branch stemming therefrom, paper transport means for passing said sheet along said loop wherein said sheet is imprinted on a first side, for turning said sheet over, for passing said sheet into said branch, and for returning said sheet to said loop a second time for imprinting a second side of said sheet, and alignment correction means along said paper path, said duplexing unit being attachable as a module to an electrographic printing apparatus.

19. A duplexing unit for attachment to an electrographic printing apparatus which produces hard copies of information to be recorded on a sheet of paper or the like, comprising a first region, a second region and an area of reversion, said first region, second region, and area of reversion comprising a paper path, said paper path comprising a loop and a branch stemming therefrom, paper transport means for passing said sheet along said loop wherein said sheet is imprinted on a first side, for turning said sheet over, for passing said sheet into said branch, and for returning said sheet to said loop a second time for imprinting a second side of said sheet, and an openable lid located adjacent said paper path, said lid providing access to said paper path, said duplexing unit being attachable as a module to an electrographic printing apparatus.

20. The duplexing unit of claim 16 wherein said lid is located above said paper path, said lid providing access to said paper path from above.

21. An electrographic printing apparatus for producing hard copies of information to be recorded on two sides of a sheet of paper or the like, comprising a housing, a source of paper and an output receptacle for receiving said paper after is imprinted, a first paper path along which said paper travels between said source and said output receptacle, a photoconductive member for storing a latent electrostatic image of the information to be imprinted, said photoconductive member being located adjacent said first paper path and coming into contact with a first side of said paper in a transfer zone located in said first paper path to imprint said first side of said paper, a second paper path operative to receive said paper from said first paper path, to turn said paper over, and to return said paper to said first paper path at a location prior to said transfer zone so that a second side of said paper is imprinted, and alignment correction means located along said second paper path.

22. An electrographic printing apparatus for producing hard copies of information to be recorded on two sides of a sheet of paper or the like, comprising a housing, a source of paper and an output receptacle for receiving said paper after it is imprinted, a first paper path along which said paper travels between said source and said output receptacle, a photoconductive member for storing a latent electrostatic image of the information to be imprinted, said photoconductive member being located adjacent said first paper path and coming into contact with a first side of said paper in a transfer zone located in said first paper path to imprint said first side of said paper, a second paper path operative to receive said paper from said first paper path, to turn said paper over, and to return said paper to said first paper path at a location prior to said transfer zone so that a second side of said paper is imprinted, and controller means for formatting the information to be imprinted on both sides of said paper.

23. An electrographic printing apparatus for producing hard copies of information to be recorded on two sides of a sheet of paper or the like, comprising a housing, a source of paper and an output receptacle for receiving said paper after it is imprinted, a first paper path along which said paper travels between said source and said output receptacle, a photoconductive member for storing a latent electrostatic image of the information to be imprinted, said photoconductive member being located adjacent said first paper path and coming into contact with a first side of said paper in a transfer zone located in said first paper path to imprint said first side of said paper, a second paper path operative to receive said paper from said first paper path, to turn said paper over, and to return said paper to said first paper path at a location prior to said transfer zone so that a second side of said paper is imprinted, and vacuum transport means located above said first paper path for transporting said paper from above.

24. An electrographic printing apparatus for producing hard copies of information to be recorded on two sides of a sheet of paper or the like, comprising a housing, a source of paper and an output receptacle for receiving said paper after it is imprinted, a first paper path along which said paper travels between said source and said output receptacle, a photoconductive member for storing a latent electrostatic image of the information to be imprinted, said protoconductive member being located adjacent said first paper path and coming into contact with a first side of said paper in a transfer zone located in said first paper path to imprint said first side of said paper, a second paper path operative to receive said paper from said first paper path, to turn said paper over, and to return said paper to said first paper path at a location prior to said transfer zone so that a second side of said paper is imprinted, and an openable lid located adjacent said first and second paper paths, said openable lid providing access to said first and second paths.

25. The electrographic printing apparatus of claim 24 wherein said lid is located above said second paper path, said lid providing access to said second paper path from above.

* * * * *